Patented Oct. 18, 1932

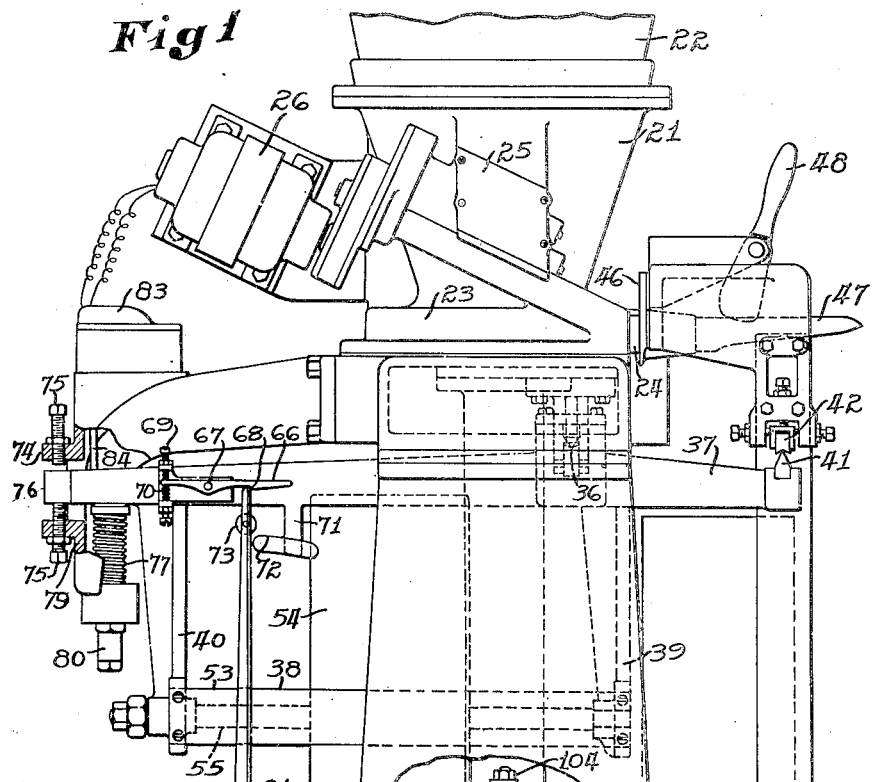
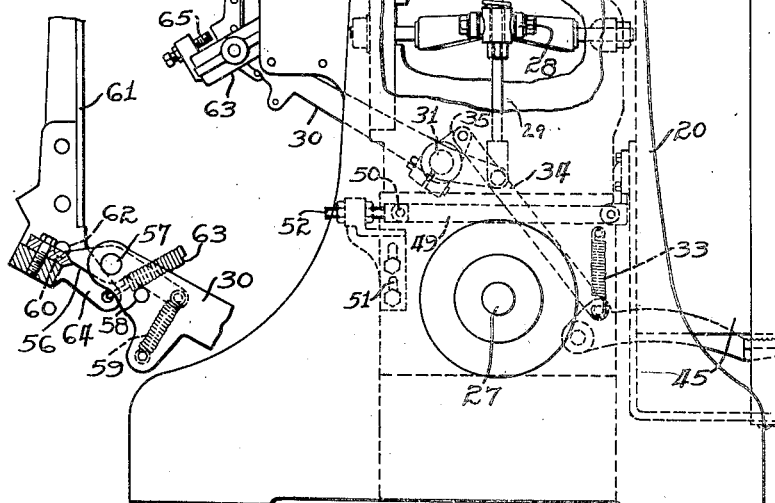
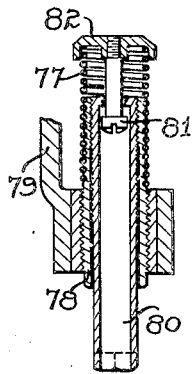

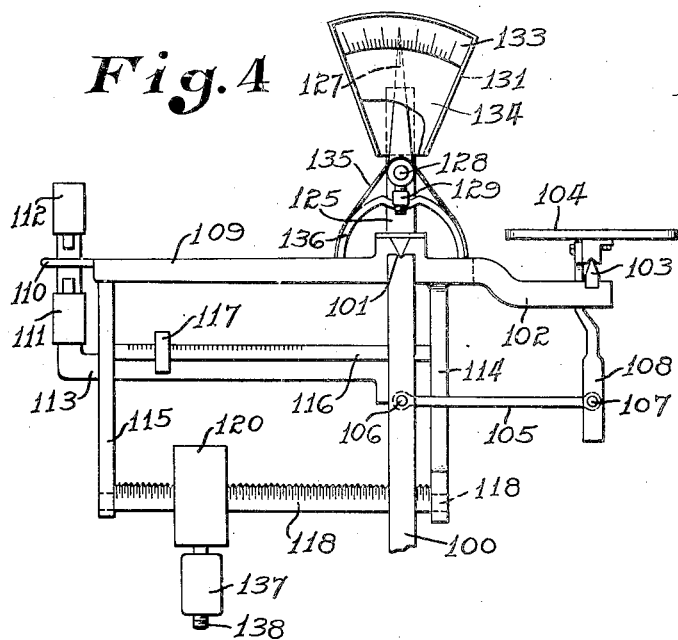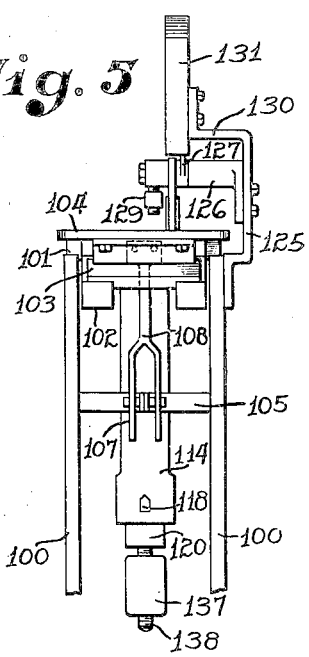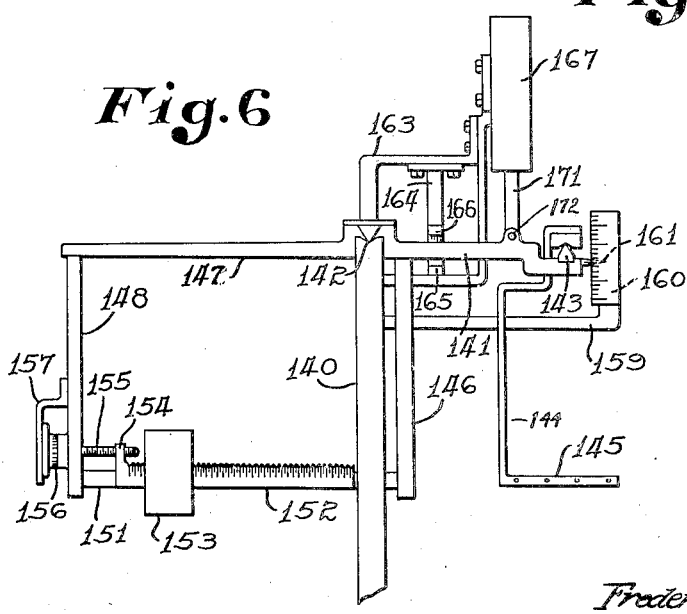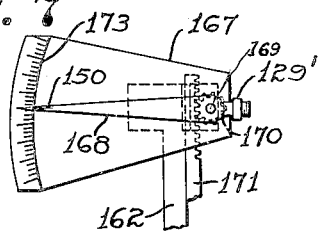

1,882,754

UNITED STATES PATENT OFFICE

FREDERICK G. L. BOYER, OF CHICAGO, ILLINOIS, ASSIGNOR, BY MESNE ASSIGNMENTS, TO ST. REGIS PAPER COMPANY, OF NEW YORK, N. Y., A CORPORATION OF NEW YORK

WEIGHING DEVICE

Application filed March 7, 1929. Serial No. 344,934.

This invention relates to a weighing device, and more particularly to a weighing device of the pendulum type and to a combination of such a device and a filling and weighing apparatus.

The invention further relates to a weighing device of the pendulum type which has a limited movement intended to occur during the final weighing of a package being filled, or to occur near a predetermined weight limit. The invention further pertains to a weighing device of the pendulum type in which there is a weight adjustable in a direction parallel with the load-carrying arm, and so that the swing of the load-carrying arm through a given arc will represent substantially the same increments of weight regardless of adjustment of the weight to vary the load which is necessary to start the load-carrying arm swinging through said given arc.

Details and additional features of the invention will appear as the description proceeds.

In the accompanying drawings forming a part of this application, Figure 1 is an elevation of apparatus embodying the invention with parts broken away for purposes of illustration; Figs. 2 and 3 are enlarged details of parts of the apparatus shown in Figure 1; Fig. 4 is a side elevation of the weighing device apart from a filling device, and adapted to be used either with a filling device or as a check weighing device; Fig. 5 is an elevation of the apparatus shown in Fig. 4, viewing that apparatus from the right of Fig. 4; Fig. 6 is an elevation similar to Fig. 4, but having a different type of indicating device and a different support for the load; Fig. 7 is an elevation of an indicating device shown in Fig. 6, viewed from the right of that figure.

The apparatus illustrated in the drawings comprises side members 20 upon which the working parts are supported. Above these members there is mounted a hopper 21, above which there may be a continuation or a storage reservoir 22, or any suitable means for guiding or feeding material into hopper 21.

The lower end of hopper 21 is expanded into a circular propeller chamber 23 having a horizontal discharge outlet 24. On the side of hopper 21 and above portion 23 there is a casing 25 in which there is feeding means driven by a motor 26 and adapted to receive material from hopper 21 and feed it into the upper side of discharge passage 24.

A horizontal shaft 27 near the bottom of the frame drives a vertical shaft which is connected by a clutch to a shaft driving a centrifugal propeller rotating on a vertical axis in portion 23 of the hopper and adapted to discharge material through passage 24. The said clutch is controlled by a lever 28 connected by a link 29 to a lever 30 having limited oscillation on a rock shaft 31. A foot pedal 32 normally raised by a spring 33 is connected by a link 34 with an arm 35 on shaft 31, so that depression of the pedal acts through the rock shaft 31, lever 30, link 29 and lever 28 to close the clutch and start the operation of the centrifugal propeller. A latch, which will be described later, keeps lever 30 in clutch-closing position after it has been moved to that position until the latch is released. The lost motion between rock shaft 31 and lever 30 allows spring 33 to raise pedal 32, when released, without affecting lever 30.

A weighing device of the pendulum type is pivoted on knife edges 36 supported on the frame. The weighing device comprises an upper member 37 and a lower member 38 connected to the upper member by brackets 39 and 40. The right end of member 37, as viewed in Fig. 1, is provided with knife edges 41 on which rest V-blocks 42 supporting a bag carrier. The carrier comprises a bottom 43, sides 44 and back 45, the top of the sides being connected by a bracket 46 which carries a spout 47 adapted to register with discharge passage 24 and to enter the valve of a bag that is to be filled. Bracket 46 carries a clamp 48 adapted to secure a bag in position on spout 47.

The lower end of the carrier is connected by a link 49 to a pivot 50 mounted adjustably on the frame. Link 49 is equal in length to the load-carrying arm constituted by the portion of member 37 between pivots 36 and 41 and pivot 50 is adjusted vertically by means of bolt and slot connection 51 so that the link is parallel with the arm, and is adjusted horizontally by screw 52 so as to bring spout 47 into proper relation to the discharge end of passage 24.

Lower member 38 of the weighing device comprises side pieces 53 between which there slides a weight 54 threaded on a screw 55 by means of which it may be adjusted. The weight is adjustable parallel with the direction of the load-carrying portion of member 37.

At the end of lever 30 opposite to link 29 there is a projecting member 56 pivoted at 57 to the lever and having the upward movement of its outer end limited by a stop 58 encountered by its inner end. A spring 59 normally holds the said inner end down against the stop.

When the apparatus is in filling position, the outer end of member 56 rests in a wear block 60 mounted on the lower end of a trigger 61 pivoted to the frame at 62. A spring 63 having one end connected to the frame and the other end connected to a downwardly projecting arm 64 on trigger 61 tends to throw the upper end of the trigger to the left until its movement is limited by a stop screw 65 mounted on the frame; but when member 56 rests on wear block 60, its downward pressure overcomes spring 63 and tends to swing the upper end of the trigger to the right.

A latch 66 pivoted at 67 on member 37 of the weighing device has a notch 68 which engages the upper end of trigger 61 and restrains its movement until the bag is properly filled. The upward movement of the left end of latch 66 is stopped by screw 69, against which it is held normally by a spring 70. A lug 71 attached to member 37 has a surface positioned immediately below the path of a roller 73 on trigger 61 when downward movement of a bag raises pivot 67 and latch 66 so as to release trigger 61 and allow it to swing under the influence of member 56.

Lugs 74 suitably mounted on the frame are provided with stop screws 75 between which there is located an extension 76 of member 37, whereby the swing of the weighing device is limited.

Mounted on the frame beneath member 37 adjacent to the stop screws there is a spring 77. Preferably this spring is mounted as shown in Fig. 3. A sleeve 78 is screwed into a bracket 79 on the frame, and its upper end is grooved to receive the spring snugly. Within sleeve 78 there is screwed a hollow member 80 having a hole in its upper end through which there works a screw 81 attached to a stop plate 82. By this mounting the effective length of the spring can be adjusted as well as the tension on the spring and the position of plate 82 at the upper limit of its movement.

Above the left end of member 37 there is mounted a switch 83 controlling the circuit to motor 26 and opening that circuit when the switch is actuated by a plunger 84 raised by member 37 when it moves in response to the weight of a bag.

The operation of the apparatus thus far described will be stated at this time. With a bag properly positioned on the filling spout, the main propeller is started by depressing treadle 32 and closing the clutch. Preferably, the auxiliary feeding device is started at substantially the same time, although it may be started at any desired subsequent point of time before the completion of the filling of the bag. The parts are ordinarily so proportioned that the weighing device does not begin to move until the greater portion of the charge has been filled into the bag. The mount which is filled into the bag before the weighing device begins to operate and the increments necessary thereafter to produce the desired action of the weighing device may be adjusted as desired, but for purposes of description, it will be arbitrarily assumed that a bag is to be filled with ninety-six pounds of material and that it is desired to fill about 88 lbs. into the bag before the weighing device begins to move and that it is desired to shut off the main feed and continue with the auxiliary feed when the weight of the bag reaches 92 lbs. Under these circumstances, weight 54 is so positioned that the load-carrying end of member 37 begins to move downward when the weight in the bag reaches 88 lbs. The lifting spring 77 acts against the weight and its adjustment must be taken into consideration in determining the point when the weight will begin to swing upward. As the weight swings outward and upward with respect to the fulcrum of the weighing device, the extension of the spring lessens its lifting force and in this way greater increments of load upon the weighing device are required in order to swing the weight while the spring is acting than would be required if the spring were omitted. The parts are preferably adjusted so that the spring reaches the limit of its expansion allowed by plate 82 at substantially the time that latch 66 is lifted clear of trigger 61.

When the swing of weight 54 reaches the point where trigger 61 is released, the left end of lever 30 swings downward and link 29 is raised, thereby opening the clutch and stopping the main propeller. The feed from the auxiliary feeding device is, of course, continued until weight 54 is swung far enough to open switch 83 and stop motor 26. While the varying effective force of weight 54 tends to prevent its being swung farther than the position justified by the weight of material in the bag, the momentum of the parts is sometimes such as to continue the motion of the weighing device, after the main feed is stopped, to a point beyond that justified by the weight of the material in the bag, after which it is retarded until it is less far than it should be to equal the load, and thereafter again is swung in the other direction too far, thus continuing to oscillate above and below the exact weight point. Under such circumstances, switch 83 may be opened on an excess swing of the weight upward, and then closed on the return movement of the weight and then again opened on the upward oscillation, thus being opened and closed several times before remaining open, the open periods becoming successively longer. In this way the auxiliary feed is gradually stopped, small increments being added during each downward swing of the weight until substantially the exact weight is reached.

The cessation of the lifting force of spring 77 at substantially the time the main feeding device stops tends to dampen this swing of the weighing device relative to the exact point justified by the load. By adjusting 78 and 80 as described above, the value of the lifting force of the spring at the upper limit of its movement may be varied to secure the most desirable dampening effect on the swing. When roller 73 is employed, it will be understood that, when trigger 61 is tripped, surface 72 will encounter this roller and positively stop the swinging movement of the weighing device if it would otherwise swing upward to an unjustified extent due to the momentum acquired before the trigger is released. When the swing is not excessive, roller 73 and surface 72 do not contact. The roller may be employed or omitted, as preferred.

When the permanent opening of switch 83 indicates the completion of the filling of the bag, clamp 48 is released and the bag removed, after which another bag may be placed in position and the filling operation repeated.

If it is desired to change from a 96 lb. bag to a 48 lb. bag, for example, weight 54 is moved to the right until it will begin to swing outward and upward at 40 lbs., instead of 88 lbs. This movement of the weight is in exact parallelism with the line between the fulcrum point of the weighing pendulum and the pivot point of the load, which line may be called the load-supporting arm of the pendulum. It has been discovered that when the weight is adjusted along this line packages of different sizes may be filled on the same scale with precisely the same action of the weighing device during the final stages of the weighing. That is, with the adjustment specified above, the weighing device will begin to wing at 40 lbs., the main feed will be stopped at 44 lbs., and the auxiliary feed will be stopped at 48 lbs. In other words, if the device is set so that the pendulum scale moves during the final 8 lbs., of the filling of a 96 lb. bag and the weight is adjusted to start movement of the pendulum at 40 lbs., or any other weight from zero to the limit of the capacity of the scale, the operations will take place in exactly the same sequence during the subsequent filling of 8 lbs. into the supported bag, without adjustment of other parts. In this way the apparatus may be adjusted for filling an 8 lb. bag or any other size bag from that up to the limit of capacity of the apparatus simply by moving weight 54 to the required point.

The spring may be omitted and the weighing device will still operate substantially as described above. The only difference is that the movement of the pendulum from the time it starts until the auxiliary feed is stopped will be substantially equal for each equal increment, whereas with the spring added the movement of the scale is less in proportion to the increased load during the time the scale operates than it would be otherwise or than it is after the action of the spring has stopped.

Adjustment of the spring, other things being equal, does not change the load necessary to bring the scale to full load position, but adjustment changing the compression of the spring varies the load necessary to start the swing of the pendulum, and adjustment of the limit of the spring varies both the point and the load at which it will cease to act.

It will be readily understood that the particular feeding device employed does not affect the weighing action and that any suitable feeding device may be employed for filling any desired receptacle with suitable changes in the apparatus. The weighing device is adapted to operate in the same way with different types of filling machines which are to be stopped or in which the flow of material is to be cut off, when the desired weight is reached, by the movement of the weighing device.

Figures 4 to 7, inclusive, illustrate an alternative use of a weighing device constructed substantially upon the same principles.

In Fig. 4 there are shown supports 100. Pivoted at 101 upon these supports there is a pendulum scale comprising load-carrying arm 102 having thereon a knife edge support 103 upon which the weighing platform 104 is mounted. A link 105 has a forked end pivoted at 106 to support 100 and its other end pivoted at 107 to a bracket 108 extending downward from platform 104, link 105 being parallel with the load-supporting arm and maintaining the platform 104 in horizontal position.

Extending to the rearward from load-supporting arm 102 there is an arm 109 terminating in a projection 110 which is positioned between stops 111 and 112 supported on a bracket 113 attached to support 100. Extending downward from arm 102 there is a bracket 114 and extending downward from arm 109 there is a bracket 115. Between these brackets there is a rod 116 properly graduated and carying a small weight 117. At the lower ends of brackets 114 and 115 there is a bar 118 which is notched or graduated and carries a weight 120. Rising from the frame of the machine there is a bracket 125 which has an end 126 projecting over fulcrum point 101. A pointer 127 is pivoted at 128 to this projection 126. A counterpoise 129 is provided on pointer 127 so that it is properly balanced on its pivot. A bracket 130 rises from bracket 125 and carries a dial casing 131 within which pointer 127 operates. In front of the end of the pointer there is arranged a graduated scale member 133 which may be curved at such an arc that equal spaces upon this scale will be indicated by the central line 150 on the pointer for equal changes in weight of the load on platform 104 while the pendulum is swinging clear of stops or springs. A glass 134 may be provided in front of the pointer.

A steel strap or other suitable flexible belt 135 is attached to arms 102 and 109 and cooperates with the rounded boss on pointer 127 surrounding pivot 128, so that oscillation of the weighing device about pivot 101 oscillates pointer 127. An arcuate guide member 136 is attached to the scale pendulum to maintain the belt in such a position that it will at all times operate the pointer in proper ratio to the movement of the pendulum.

An adjusting weight 137 may be threaded upon a vertical screw 138 attached to main weight 120. Adjustment of this auxiliary weight vertically is for the purpose of making the movement of the pendulum actuate the pointer correctly in accordance with the markings on the dial 133.

In the operation of the device, weight 120 is moved to such a position that the pendulum will be in the middle of its travel as indicated by pointer 127 on dial 133 when the exact desired load is placed on platform 104. Stops 111 and 112 may be provided with spring members similar to that described in connection with the weighing device shown in Figure 1, if desired, so that the movement of the pointer towards the ends of its swing, after the spring stop has been encountered in either direction, will indicate greater increments than the same movement during the middle portion of its swing. This may be a convenience where a fine adjustment at the exact weight point is desired with a greater range of weighing action of the scale than would otherwise result.

Movement of weight 120 upon bar 119 suffices for coarser adjustment of the setting of the scale. Fine adjustment may be made by adjustment of weight 117.

The device illustrated in Figs. 6 and 7 is very similar to that shown in Figs. 4 and 5. In this form of apparatus there are supports 140 upon which load-carrying arm 141 is pivoted at 142. Load-carrying arm 141 is provided with a pivot 143 on which there is mounted a bail 144 supporting the load-carrying platform 145. Projecting downward from arm 141 there is a bracket 146 and extending beyond pivot point 142 there is an arm 147 having a downwardly extending bracket 148. Between the lower ends of brackets 146 and 148 there is a rod 151 on which there slides a graduated bar 152 carrying a weight 153. Through a lug 154 at the end of bar 152 there is threaded a screw 155 having a graduated head 156 operating between bracket 148 and a stop plate 157. Extending forward from support 140 there is a bracket 149 carrying a vertical plate 160 having scale marks thereon and back of which there moves a pointer 161. Also attached to support 140 there are brackets 162 and 163 between which there is a member 164 carrying stops 165 and 166 for limiting the oscillation of the weighing pendulum. On the upper end of bracket 162 there is a dial casing 167 within which a pointer 168 is mounted upon pivot 169. A gear 170 on pointer 168 is in mesh with a vertical rack bar 171 connected at its lower end at 172 to load-supporting arm 141. Dial casing 167 is provided with a graduated plate 173 in front of pointer 168. This plate may be arranged at the proper angle to have equal distances marked thereon to correspond to equal increments of loads upon the scale while the pendulum is swinging free.

In each of the instances noted, the pointer may be provided with a central indicating line 150 and as the pointer moves, the exact weight is indicated by the point on the scale where this line reaches the edge of the scale.

The operation of this device is the same as that described above in connection with Figures 4 and 5, the only difference being the arrangement for carrying the load, the connections for operating the indicating pointer, and the device for fine adjustment of the weight, the latter being made by micrometer screw 155 instead of by small weight 117.

It will be readily understood that the alternative forms of this device have been shown by way of illustration and not as indicating all possibilities. A pendulum scale is particularly suitable for use with a filling operation which is to be checked upon the scale indicating the desired weight because in this type of scale the movement of the weighing device is continuous during the final filling of the receptacle and the movement is approximately proportional to the rate of filling. Where a balance scale is used, the parts are at rest until a fixed amount is placed in the receptacle and no appreciable increment is intended to be filled in thereafter during the weighing operation. Inasmuch as the receptacle, load therein, and moving parts of the scale have considerable weight, it requires a considerable interval of time for the balance scale to respond to a slight excess of weight over the required balance. In the pendulum type, the scale may be arranged to reach the point corresponding to a given load at approximately the time that load is in the receptacle, because the scale is moving for an appreciable time before that point is reached and therefore the element of momentum is to a considerable extent approximated to the rate of filling and therefore the position of the scale more accurately indicates the load thereon than would be the case if the parts were at rest until substantially the tripping weight was filled into the receptacle.

It will be likewise apparent that the same considerations are of some advantage in filling a receptacle by hand up to a weight indicated on a dial, and that the apparatus may be used for other purposes, such as check weighing, with advantage.

In the appended claims, the phrase "of the pendulum type" is intended to indicate the type where the main counterpoise swings as a pendulum weight, and to distinguish from a balance weighing device and from a balance beam with a pendulum indicator used in conjunction therewith.

What is claimed is:

1. In combination, a weighing device of the pendulum type adapted to support and weigh a receptacle, and in which the pendulum weight is the only large counter-balancing weight, means to feed material into the receptacles supported on the weighing device, and means dependent upon the motion of the weighing device for stopping the feeding of material.

2. In combination, a weighing device of the pendulum type adapted to support and weigh a receptacle, a main feeding device adapted to feed material rapidly into the receptacle supported on the weighing device, an auxiliary feeding device adapted to feed material at a lesser rate into the receptacle supported on the weighing device, and means dependent upon the motion of the weighing device for stopping the main feed before the desired weight of material has been placed in the receptacle and means dependent upon the motion of the weighing device for stopping the auxiliary feed when the weight of material in the receptacle has reached the desired amount.

3. In combination, a weighing device of the pendulum type adapted to support and weigh a receptacle, and in which the pendulum weight is the only large counter-balancing weight, means to feed material into the receptacle supported on the weighing device, means dependent upon motion of the weighing device for stopping the feeding of material, and means to adjust the weight of the pendulum so that the weighing device will swing through the desired arc at the desired rate to stop the feeding of material when the desired weight is reached.

4. In combination, a weighing device of the pendulum type having a load-carrying arm and adapted to support and weigh a receptacle, means to feed material into the receptacle supported on the weighing device and means dependent upon motion of the weighing device for stopping the feeding of material, and means for adjusting the center of gravity of the weighing device in a direction parallel with the direction of the load-carrying arm of the pendulum, whereby weighing action of the pendulum during its swing through the arc where the stopping is accomplished remains constant for different weights of material in accordance with the adjustment of the pendulum weight.

5. In combination, a weighing device of the pendulum type adapted to support and weigh a receptacle, means to feed material into the receptacle supported upon the weighing device, means dependent upon the motion of the weighing device for stopping the feeding of material, and a spring adapted to aid the weight of the material in the receptacle in starting the swing of the pendulum, the spring being constructed so as to lessen its aid to the swing of the pendulum as the swing proceeds.

6. In combination, a weighing device of the pendulum type adapted to support and weigh a receptacle, means to feed material into the receptacle supported upon the weighing device, means dependent upon the motion of the weighing device for stopping the feeding of material, a spring adapted to aid the weight of the material in the receptacle in starting the swing of the pendulum, the spring being constructed so as to lessen its aid to the swing of the pendulum as the swing proceeds, and a stop stopping the aiding action of the spring upon the pendulum before the pendulum reaches the point at which the feed to the receptacle is finally stopped.

7. In combination, a weighing device of the pendulum type adapted to support and weigh a receptacle, feeding means adapted to feed material at a rapid rate into the receptacle supported on the weighing device, auxiliary means to feed material at a lesser rate into the receptacle supported on the weighing device, a spring adapted to aid the weight of the material in the receptacle in starting the swing of the pendulum, means dependent upon the motion of the weighing device and actuated before the weighing device indicates the full amount of the desired weight has been filled into the receptacle, to stop the main feeding, a stop limiting the action of the spring at the point in the movement of the pendulum where the main feeding is stopped, and means for stopping the auxiliary feeding dependent upon the movement of the weighing device and actuated when the full amount of the material desired in the receptacle has been received thereby.

8. In combination, a weighing device of the pendulum type adapted to support and weigh a receptacle, means to feed material into the receptacle supported on the weighing device, a spring adapted to aid the weight of the material in the receptacle in starting the pendulum to swing, means for adjusting the effective length of the spring and means dependent upon motion of the weighing device for stopping the feeding.

9. A weighing device of the pendulum type adapted to support and weigh a receptacle, means to feed material into the receptacle supported on the weighing device, a spring adapted to assist the weight of material in the receptacle to start the swinging of the pendulum, a member having a groove into which a portion of the spring fits, means to effect relative adjustment of the member and spring to vary the effective length of the spring, and means dependent upon motion of the weighing device for stopping the feeding.

10. A weighing device of the pendulum type adapted to support and weigh a receptacle, means to feed material into the receptacle supported on the weighing device, a spiral spring adapted to assist the weight of material in the receptacle to start the swing of the pendulum, a sleeve mounted concentrically with said spring and adjustable lengthwise thereof, the sleeve having a spiral groove therein into which the spring fits snugly, a stop for the end of the spring, said stop being adjustable relatively to the sleeve, and means dependent upon motion of the weighing device for stopping the feeding.

11. In combination, a weighing device of the pendulum type having a limited normal weighing swing, a spiral spring, a sleeve mounted concentrically with said spring and adjustable lengthwise thereof, the sleeve having a spiral groove therein into which the spring fits snugly, a stop at the end of the spring, said stop being adjustable relatively to the sleeve, and an arm on said pendulum device in position to engage said stop as said pendulum moves beyond said normal weighing swing.

12. In combination, a weighing device of the pendulum type having a limited normal weighing swing and a spring in position to be engaged by said device and yieldingly resist further swing of the pendulum when it reaches an end of said normal weighing swing.

13. In combination, a weighing device of the pendulum type having a limited normal weighing swing, and auxiliary means yieldingly resisting swing of said device beyond said normal weighing swing in the direction of a lighter load.

14. In a device for weighing loads of approximately predetermined weights, a pendulum scale and auxiliary means co-operating with the pendulum to take part of the load when the pendulum departs a predetermined amount from the position impressed thereon by said predetermined weight, as the result of a lesser load.

15. In a device for weighing loads of approximately predetermined weights, a pendulum scale, and auxiliary means decreasing the swing of the pendulum for a given change in load as the load decreases from said predetermined weight.

16. A weighing device of the pendulum type having a load-carrying arm and a weight mounted for adjustment in a direction parallel with the direction of the load-carrying arm of the pendulum.

17. A weighing device of the pendulum type having a load-carrying arm and a weight, means for adjusting the weight in a direction parallel with the direction of the load-carrying arm of the pendulum, and means for adjusting the weight perpendicularly to the direction of the load-carrying arm of the pendulum.

18. A weighing device of the pendulum type comprising means for adjusting the center of gravity in a direction parallel with the direction of the load-carrying arm of the pendulum, such adjusting means comprising means for coarse adjustment and means for fine adjustment.

19. A weighing device of the pendulum type having a weight and means for adjusting the weight in a direction parallel with the direction of the load-carrying arm of the pendulum, such adjusting means comprising means for coarse adjustment and means for fine adjustment, said fine adjustment being accomplished by a micrometer screw acting upon the weight.

20. A scale of the pendulum type comprising a load-carrying arm, means to confine the movement of the pendulum to a limited range, the weight of the pendulum and its load-carrying arm being capable of being so adjusted that the pendulum does not begin to move through said limited range until there is applied on said arm a load which is greater than the additional load required to move the pendulum through said limited range.

21. In combination, a weighing device of the pendulum type comprising means to confine the movement of the pendulum to a limited range, the weight of the pendulum and its load-carrying arm being capable of being so adjusted that the pendulum does not begin to move through said limited range until there has been placed on the device a load which is greater than the additional load required to move the pendulum through said limited range, said device being adapted to support and weigh a receptacle, means to feed material into the receptacle supported on the weighing device and means dependent upon the motion of the weighing device for stopping the feeding.

22. In combination, a weighing device of the pendulum type comprising means to confine the movement of the pendulum to a limited range, the weight of the pendulum and its load-carrying arm being capable of being so adjusted that the pendulum does not begin to move through said limited range until there has been placed on the device a load which is greater than the additional load required to move the pendulum through said limited range, said device being adapted to support and weigh a receptacle, means to feed material into the receptacle supported on the weighing device, a spring adapted to aid the weight of the material in the receptacle to start the swing of the pendulum, and means dependent upon the motion of the weighing device for stopping the feeding.

23. A scale of the pendulum type comprising means to confine the movement of the pendulum to a limited range, the weight of the pendulum and its load-carrying arm being capable of being so adjusted that the pendulum does not begin to move through said limited range until there has been placed on the scale a load which is greater than the additional load required to move the pendulum through said limited range, the weight of the pendulum being mounted for adjustment in a direction parallel with the direction of the load-carrying arm of the pendulum.

24. In combination, a weighing device of the pendulum type adapted to support and weigh a receptacle, means to confine the movement of the pendulum to a limited range, the weight of the pendulum and its load-carrying arm being capable of being so adjusted so that the pendulum does not begin to move through said limited range until there has been placed in the receptacle a load which is greater than the additional load required to move the pendulum through said limited range, means to feed material into the receptacle supported on the weighing device, means dependent upon motion of the weighing device for stopping the feeding means, and means for adjusting the weight of the pendulum in a direction parallel with the direction of the load-carrying arm of the pendulum.

In testimony whereof I have hereunto signed my name to this specification.

FREDERICK G. L. BOYER.